US007007192B2

(12) United States Patent  
Yamazaki

(10) Patent No.: US 7,007,192 B2  
(45) Date of Patent: Feb. 28, 2006

(54) INFORMATION PROCESSING SYSTEM, AND METHOD AND PROGRAM FOR CONTROLLING THE SAME

(75) Inventor: Shigeo Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 146 days.

(21) Appl. No.: 10/372,302

(22) Filed: Feb. 25, 2003

(65) Prior Publication Data

US 2003/0163744 A1 Aug. 28, 2003

(30) Foreign Application Priority Data

Feb. 26, 2002 (JP) .............................. 2002-050150

(51) Int. Cl.  
*G06F 11/00* (2006.01)

(52) U.S. Cl. ............................... 714/5; 714/13; 714/23

(58) Field of Classification Search ................ 713/100; 714/5, 13, 23, 42, 43; 710/301, 302, 104  
See application file for complete search history.

(56) References Cited

U.S. PATENT DOCUMENTS

| 4,511,982 | A | * | 4/1985 | Kurakake | .................... 700/177 |
| 5,202,965 | A | * | 4/1993 | Ahn et al. | ................... 710/302 |
| 6,189,050 | B1 | * | 2/2001 | Sakarda | ........................ 710/18 |
| 6,282,596 | B1 | * | 8/2001 | Bealkowski et al. | ......... 710/302 |
| 6,574,748 | B1 | * | 6/2003 | Andress et al. | ................ 714/11 |
| 2004/0199696 | A1 | * | 10/2004 | Chari et al. | .................. 710/302 |

FOREIGN PATENT DOCUMENTS

| JP | H04-148217 A | 5/1992 |
| JP | 2000-222375 A | 8/2000 |
| JP | 2001-147861 A | 5/2001 |

* cited by examiner

*Primary Examiner*—Scott Baderman  
(74) *Attorney, Agent, or Firm*—Sughrue Mion, PLLC

(57) ABSTRACT

An information processing system capable of dynamic CPU replacement regardless of the function of OS, and a method and a program for controlling the same. The information processing system comprises an information processor and a service processor. The service processor instructs MMCs of all cell boards in a partition that includes a cell board to be removed and an MMC of a replacement cell board to be incorporated to copy data from a memory of the cell board to be removed to a memory of the replacement cell board. Besides, when receiving a write instruction during the copying operation, the MMCs write the same data written to the cell board subject to replacement also to the memory of the replacement cell board. After the copying operation has been finished, the operations of CPUs in the partition are forcefully suspended. Subsequently, the service processor instructs BIOS to copy inside information of the CPU in the cell board subject to replacement into the CPU in the replacement cell board. When the copying operation has been finished, the service processor swaps information on the cell board subject to replacement for information on the replacement cell board, which concern OS control such as logical IDs stored outside the CPUs. Thus, the OS recognizes the replacement cell board as the replaced cell board.

14 Claims, 11 Drawing Sheets

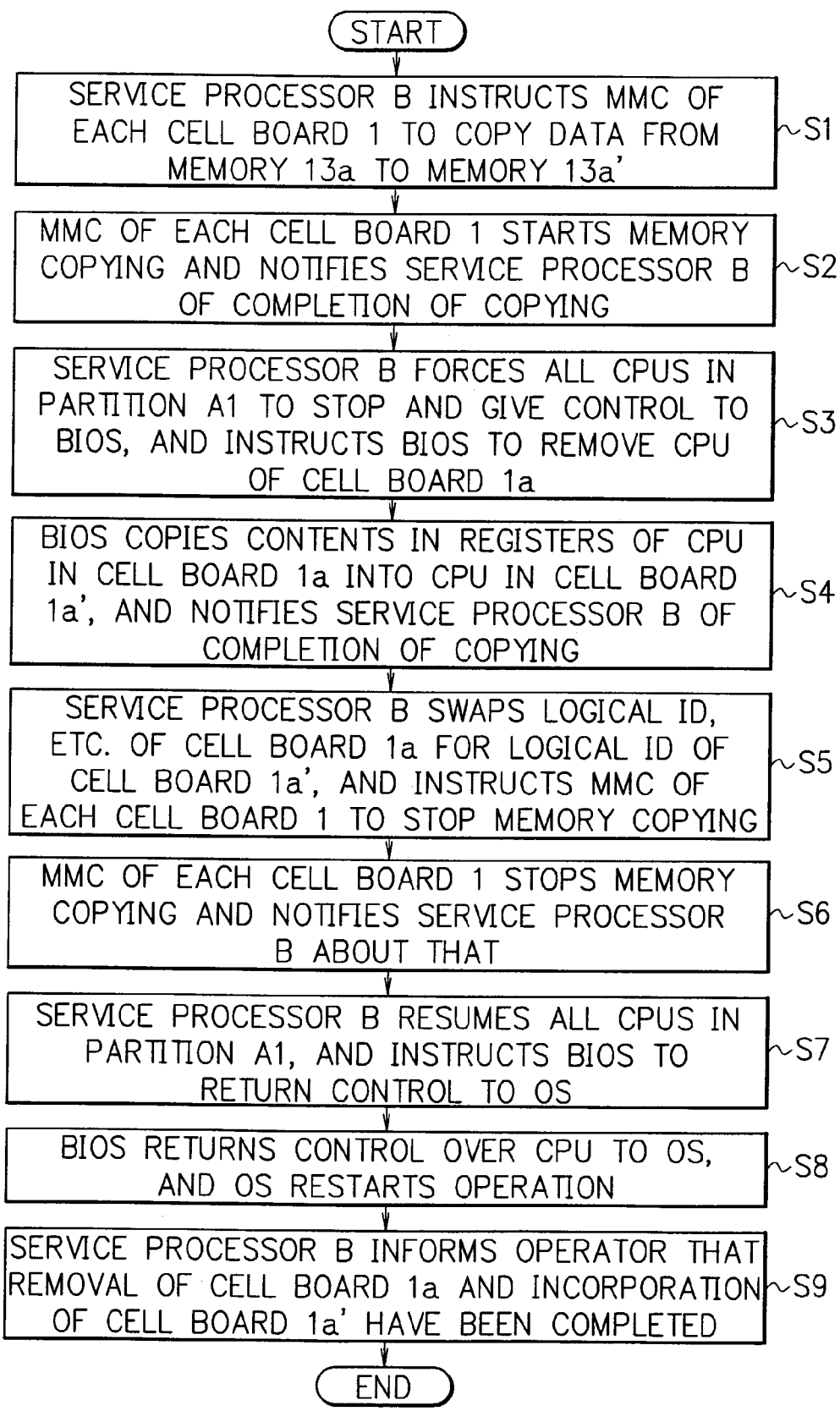

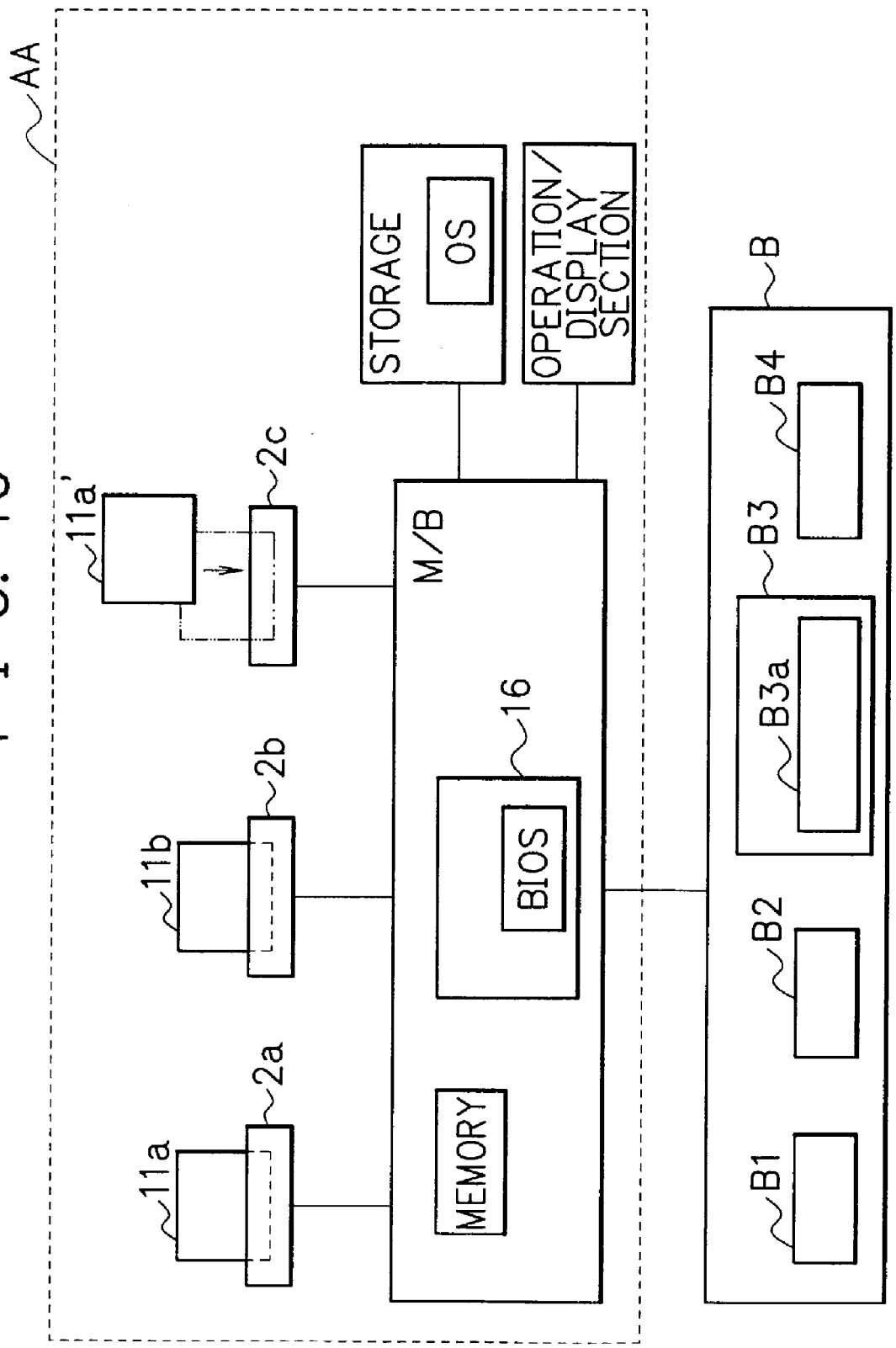

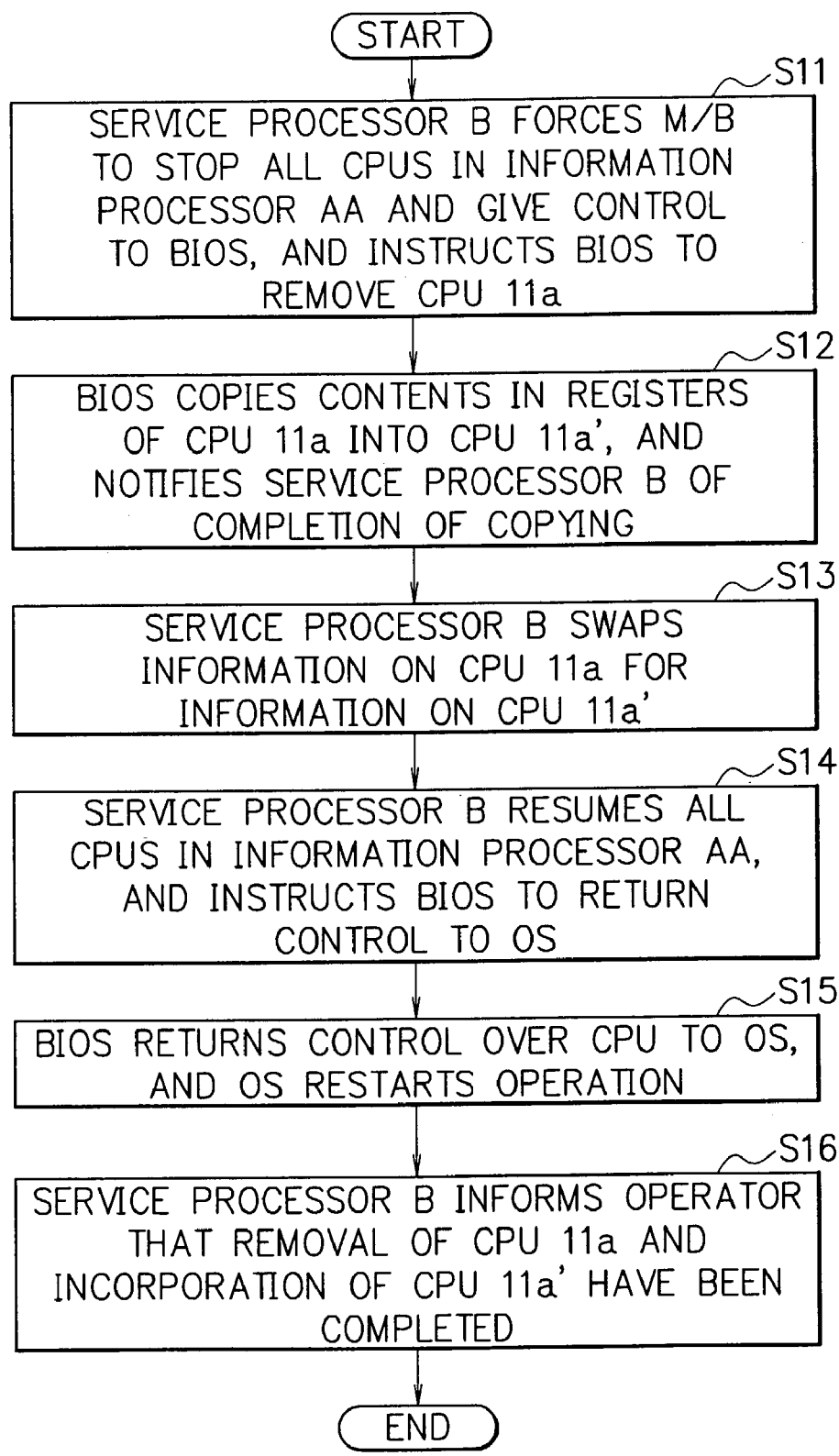

INFORMATION PROCESSING SYSTEM, AND METHOD AND PROGRAM FOR CONTROLLING THE SAME

FIELD OF THE INVENTION

The present invention relates to an information processing system, an information processing system controlling method and a program thereof, and especially to an information processing system comprising a plurality of processors (CPU) and a service processor connected thereto, which operates independently of the CPUs and stores information about the configuration of the CPUs, an information processing system controlling method and a program thereof.

BACKGROUND OF THE INVENTION

Generally, the power of an information processing system connected to a network is left on at least while the network is in service. When it is required in the use of the information processing system to maintain the system in the power on state for a certain period of time, hot plugging is desirable even in the case of replacing the CPU for maintenance to improve the reliability of the system. In other words, it is preferable that the CPU can be dynamically replaced without shutting down the operating system (OS).

One way to enable such dynamic replacement of CPU is by designing entire software including the OS to support the dynamic CPU replacement. In the following, a description will be given of a conventional dynamic CPU replacement method based on the design of the OS, etc. applied to an information processing system that is provided with cell boards as replaceable unit parts each having CPUs, a memory and a main memory controller (MMC). FIG. 1 is a block diagram showing a constructional example of a conventional information processing system.

As can be seen in FIG. 1, the information processing system comprises an information processor P and a service processor R, which are interconnected with each other. The information processor P includes cell boards 1 (1a, 1b, 1a'), connectors 2 (2a, 2b, 2c), a storage and an internal bus. The cell board 1a' is a replacement cell board. The storage stores OS P3. A part of codes of the OS P3 is loaded into a main memory(s) (memory 13a and/or memory 13b) to execute themselves by a boot loader (not shown) on the cell board(s) 1 or by the OS P3 itself dynamically. The cell board 1 is connected to the internal bus via the connector 2, and operates by the OS P3. The OS P3 is designed to support the dynamic CPU replacement, and usually dedicated for its hardware (information processor P). The cell boards 1 (1a, 1b), connectors 2 (2a, 2b), storage and internal bus constitute a partition P1 that also operates by the OS P3. The cell board 1 has CPUs 11 and 12, a memory 13 and an MMC 15. With this configuration, the information processor P serves as a symmetric multiprocessor (SMP) using a common distributed shared memory. That is, the CPUs 11 and 12 operates using the memory area of the entire partition P1 according to control by the MMC 15 in the cell board 1.

Next, the operation of the conventional information processing system for the dynamic CPU replacement will be explained with reference to FIG. 2. FIG. 2 is a flowchart showing operation for dynamically replacing the CPU in the information processing system. First, the service processor R instructs the respective MMCs 15 in the cell boards 1 (1a, 1b, 1a') to copy data stored in the memory 13a in the cell board 1a onto the memory 13a' in the replacement cell board 1a' (step P11). The MMCs 15 in the cell boards 1 (1a, 1b, 1a') start copying the data from the memory 13a to the memory 13a' at the instruction, and notify the service processor R of completion of the copying when it has been finished (step P12). On receipt of the notice, the service processor R instructs the OS P3 in the partition P1 to remove the CPUs 11a and 12a in the cell board 1a (step P13).

The OS P3 in the partition PI reschedules the process of jobs being executed by the CPUs 11a and 12a of the cell board 1a to the CPUs 11b and 12b of the cell board 1b, and removes the cell board 1a including the CPUs 11a and 12a from the OS P3. That is, processing by the CPUs 11 and 12 is degenerated. After removing the cell board 1a, the OS P3 notifies the service processor R of completion of the removal (step P14). Having received the notice, the service processor R instructs the MMCs 15 in the cell boards 1 (1a, 1b, 1a') to stop the memory copying (step P15). The MMCs 15 in the cell boards 1 (1a, 1b, 1a') stop the memory copying at the instruction, and notify the service processor R about that (step P16). Subsequently, the service processor R instructs the OS P3 to incorporate the cell board 1a' having the CPUs 11a' and 12a' (step P17). Accordingly, the OS P3 incorporates the cell board 1a' having the CPUs 11a' and 12a' to restore the processing to the original state out of the degenerated state, and notifies the service processor R of completion of the incorporation (step P18). Having received the notice, the service processor R informs an operator that the removal of the call board 1a and the incorporation of the cell board 1a' have been completed (step P19).

The above-described conventional method for dynamically replacing the CPU is sometimes employed for a mainframe in which software such as the OS is integrated into particular hardware. However, in order to apply the conventional method, software such as the OS should be designed to support the dynamic CPU replacement since replaceable unit parts are removed or incorporated by the function of the OS. Consequently, it is required to provide the OS with complicated functions to carry out rescheduling and the like so that a replacement CPU can execute jobs being run by a CPU to be replaced. Thus, design load for software is increased.

In addition, when applying the conventional method to an open system (a system that is manufactured to public standards and/or de-facto standards so as to be compatible with products of other companies) such as an open server in which software and hardware produced by different manufacturers are combined, the software should be one of general purpose software supporting the dynamic CPU replacement. This narrows the range of choice for software. Considering the present situation where there are a small number of commercial OSs that support the dynamic CPU replacement, and besides, the open system is used for various purposes, it is difficult to adopt the conventional method for the open system.

SUMMARY OF THE INVENTION

It is therefore an object of the present invention to provide an information processing system capable of dynamic CPU replacement without shutting down its OS even when the OS is not provided with the function to perform the dynamic CPU replacement, an information processing system controlling method and a program thereof.

It is another object of the present invention to provide an information processing system in which an information processor includes cell boards as replaceable unit parts each having CPUs and a memory and, even when the information processor operates by OS that is not provided with the function of dynamic CPU replacement, the cell board can be dynamically replaced without shutting down the OS, an information processing system controlling method and a program thereof.

In accordance with the first aspect of the present invention, to achieve the above objects, there is provided an information processing system comprising an information processor and a service processor operating independently of the information processor, the information processor and the service processor being interconnected with each other, wherein the information processor includes: one or more unit parts having at least one processor (CPU) that stores information in a register; and a storage that stores an operating system (OS) by which the information processor operates; and the service processor includes: a detection means for detecting whether or not a replacement unit part that can replace the unit part is connected to the information processor; and a control means for controlling the information processor after the detection means has detected the connection to stop process being executed by the CPU according to the OS, controlling the information processor to copy information stored in the unit part into the replacement unit part, changing information on the unit part and the replacement unit part so that the replacement unit part can operate according to the OS as a substitute for the unit part, and controlling the information processor to restart the process according to the OS by the replacement unit part.

In accordance with the second aspect of the present invention, there is provided an information processing system comprising an information processor and a service processor operating independently of the information processor, the information processor and the service processor being interconnected with each other, wherein: the information processor includes: one or more unit parts having at least one CPU that stores information in a register, a memory and a main memory controller (MMC); and a storage that stores OS by which the information processor operates; and the service processor includes: a detection means for detecting whether or not a replacement unit part that can replace the unit part is connected to the information processor; and a control means for controlling the information processor after the detection means has detected the connection to stop process being executed by the CPU according to the OS, controlling the information processor to copy information stored in the unit part into the replacement unit part, changing information on the unit part and the replacement unit part so that the replacement unit part can operate according to the OS as a substitute for the unit part, and controlling the information processor to restart the process according to the OS by the replacement unit part.

In accordance with the third aspect of the present invention, there is provided an information processing system comprising an information processor and a service processor operating independently of the information processor, the information processor and the service processor being interconnected with each other, wherein: the information processor includes: one or more unit parts having at least one CPU that stores information in a register, a memory and an MMC; and a storage that stores OS; the information processor operates according to the OS and a basic input output system (BIOS); and the service processor includes: a detection means for detecting whether or not a replacement unit part that can replace the unit part is connected to the information processor; and a control means for controlling the information processor after the detection means has detected the connection to stop process being executed by the CPU according to the OS, controlling the information processor to copy information stored in the unit part into the replacement unit part, changing information on the unit part and the replacement unit part so that the replacement unit part can operate according to the OS as a substitute for the unit part, and controlling the information processor to restart the process according to the OS by the replacement unit part.

In accordance with the fourth aspect of the present invention, in the second or third aspect, the control means performs the information change control to swap identification information of the unit part for identification information of the replacement unit part and to reset the MMC of each unit part so that the replacement unit part can operate according to the OS as a substitute for the unit part.

In accordance with the fifth aspect of the present invention, in one of the first to fourth aspects, the information processor further includes a replacing connection means so that the replacement unit part can be connected to the information processor, and the detection means detects whether or not the replacement unit part is connected to the replacing connection means.

In accordance with the sixth aspect of the present invention, there is provided an information processing system control method for controlling an information processing system in which an information processor and a service processor is interconnected with each other, the information processor includes one or more unit parts having at least one CPU that stores information in a register and a storage storing OS by which the information processor operates, and the service processor operates independently of the information processor, the method comprising the steps of detecting whether or not a replacement unit part that can replace the unit part is connected to the information processor; stopping process being executed by the CPU according to the OS in the information processor; copying information stored in the unit part into the replacement unit part in the information processor; changing information on the unit part and the replacement unit part so that the replacement unit part can operate according to the OS as a substitute for the unit part; and restarting the process according to the OS by the replacement unit part in the information processor.

In accordance with the seventh aspect of the present invention, there is provided an information processing system control method for controlling an information processing system in which an information processor and a service processor is interconnected with each other, the information processor includes one or more unit parts having at least one CPU that stores information in a register, a memory and an MMC, and a storage that stores OS by which the information processor operates, and the service processor operates independently of the information processor, the method comprising the steps of: detecting whether or not a replacement unit part that can replace the unit part is connected to the information processor; writing the same information written to a memory of the unit part also onto a memory of the replacement unit part in the information processor; copying information stored in the memory of the unit part into the memory of the replacement unit part in the information processor; stopping process being executed by the CPU according to the OS in the information processor; copying information stored in the unit part into the replacement unit part in the information processor; changing information on the unit part and the replacement unit part so that the replacement unit part can operate according to the OS as a substitute for the unit part; and restarting the process according to the OS by the replacement unit part in the information processor.

In accordance with the eighth aspect of the present invention, there is provided an information processing system control program including BIOS and a control program for an information processing system in which an information processor and a service processor is interconnected with each other, the information processor includes one or more unit parts having at least one CPU that stores information in a register and a storage storing OS, the information processor operates according to the OS and the BIOS, and the service processor operates independently of the information processor according to the control program, the program executing the processes of detecting whether or not a replacement unit part that can replace the unit part is connected to the information processor by the service processor; copying information stored in the unit part into the replacement unit part by the information processor; stopping process being executed by the CPU according to the OS by the information processor; changing information on the unit part and the replacement unit part so that the replacement unit part can operate according to the OS as a substitute for the unit part by the service processor; and restarting the process according to the OS with the replacement unit part by the information processor.

In accordance with the ninth aspect of the present invention, there is provided an information processing system control program including BIOS and a control program for an information processing system in which an information processor and a service processor is interconnected with each other, the information processor includes one or more unit parts having at least one CPU that stores information in a register, a memory and an MMC and a storage storing OS, the information processor operates according to the OS and the BIOS, and the service processor operates independently of the information processor according to the control program, the program executing the processes of: detecting whether or not a replacement unit part that can replace the unit part is connected to the information processor by the service processor; writing the same information written to a memory of the unit part also onto a memory of the replacement unit part by the information processor; copying information stored in the memory of the unit part into the memory of the replacement unit part by the information processor; stopping process being executed by the CPU according to the OS by the information processor; copying information stored in the unit part into the replacement unit part by the information processor; changing information on the unit part and the replacement unit part so that the replacement unit part can operate according to the OS as a substitute for the unit part by the service processor; and restarting the process according to the OS with the replacement unit part by the information processor.

In accordance with the first to ninth aspects of the present invention, it is possible to remove or incorporate the unit part without shutting down the OS running in the information processor regardless of the function of the OS.

Incidentally, the unit part may be the CPU, or the cell board having the CPU, memory and MMC. Besides, the unit part may be a board provided with the CPU and parts having no storage for storing information such as a register and a memory.

BRIEF DESCRIPTION OF THE DRAWINGS

The objects and features of the present invention will become more apparent from the consideration of the following detailed description taken in conjunction with the accompanying drawings in which:

FIG. 9 is a flowchart showing example operation for dynamically replacing the cell board in the information processing system according to the first embodiment of the present invention;

FIG. 10 is a block diagram showing a constructional example of an information processing system according to the second embodiment of the present invention; and FIG. 11 is a flowchart showing example operation for dynamically replacing the CPU in the information processing system according to the second embodiment of the present invention.

DESCRIPTION OF THE PREFERRED EMBODIMENT

Figure 1:
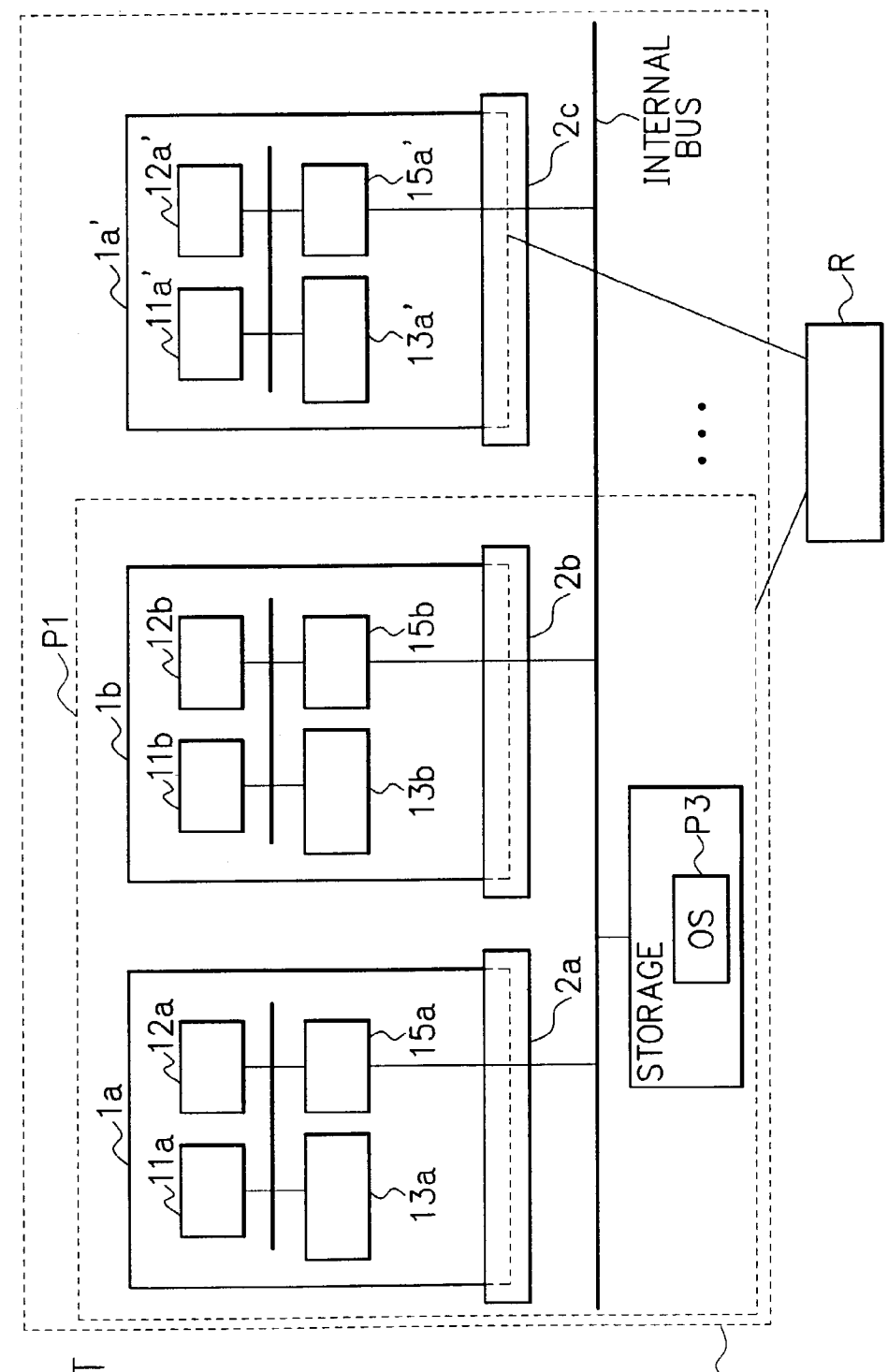
FIG. 1 is a block diagram showing a constructional example of a conventional information processing system.
Figure 2:
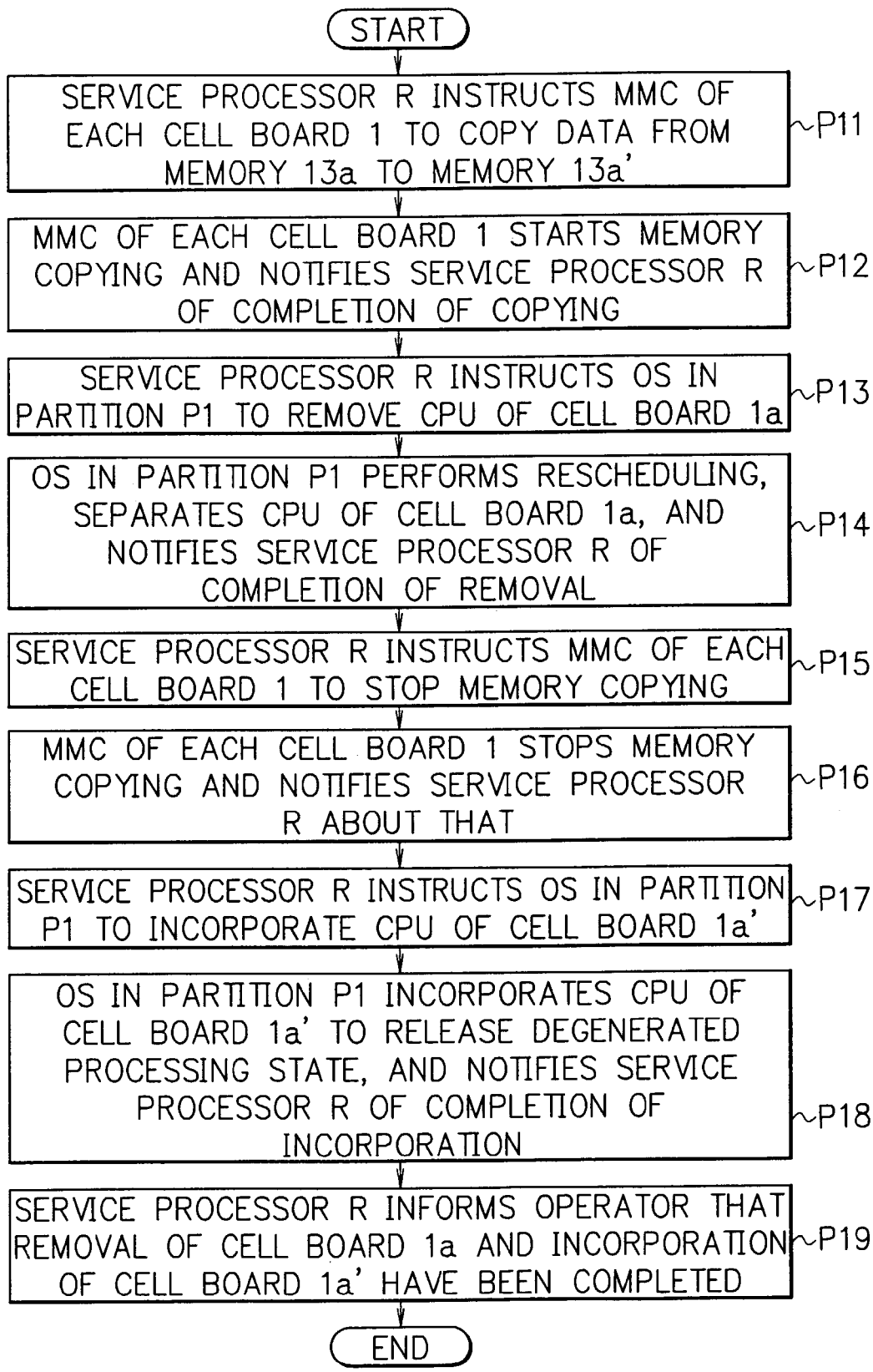
FIG. 2 is a flowchart showing example operation for dynamically replacing a cell board in the conventional information processing system.

Referring now to the drawings, a description of preferred embodiments of the present invention will be given in detail.

Figure 3:
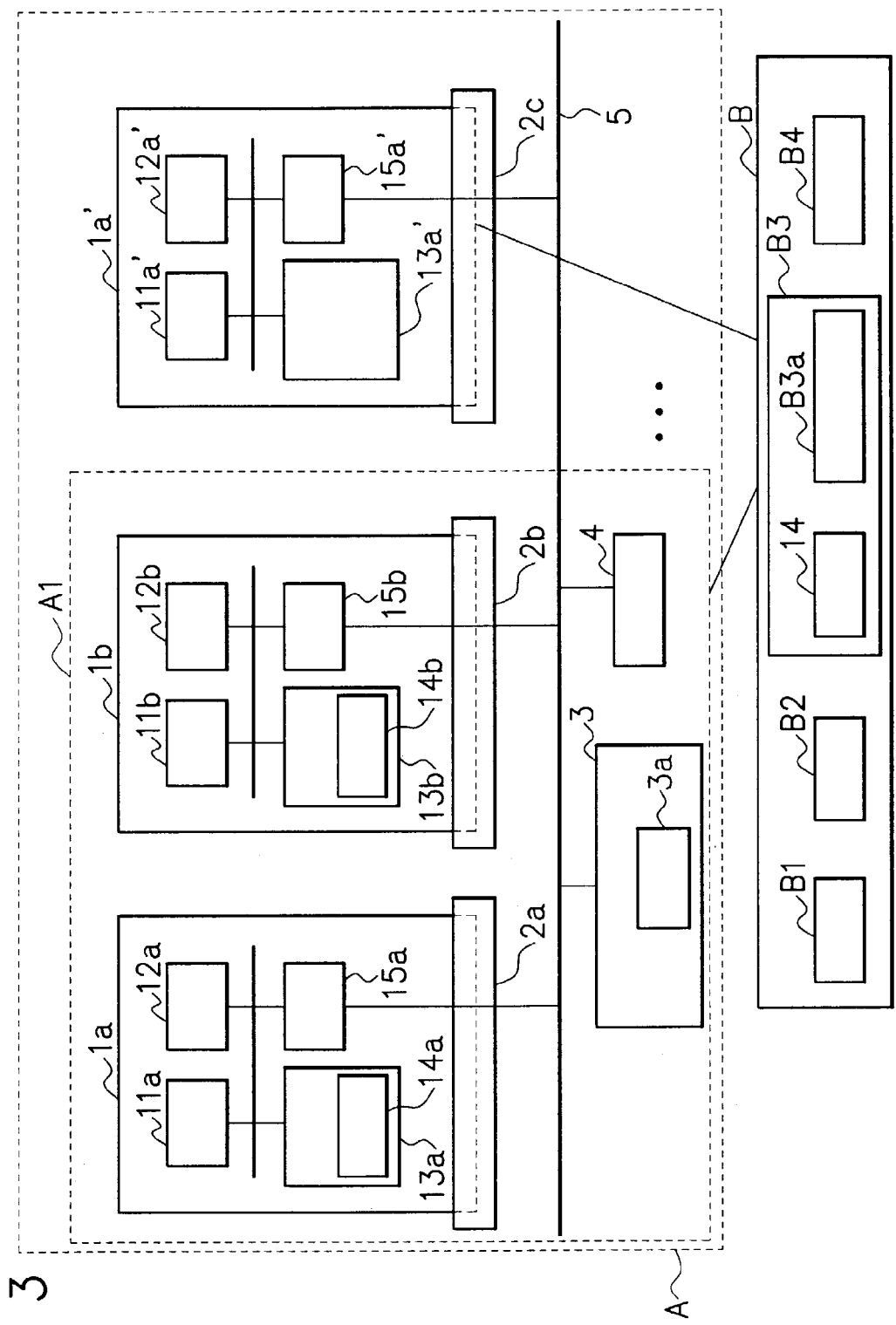
FIG. 3 is a block diagram showing a constructional example of an information processing system according to the first embodiment of the present invention.
Figure 4:
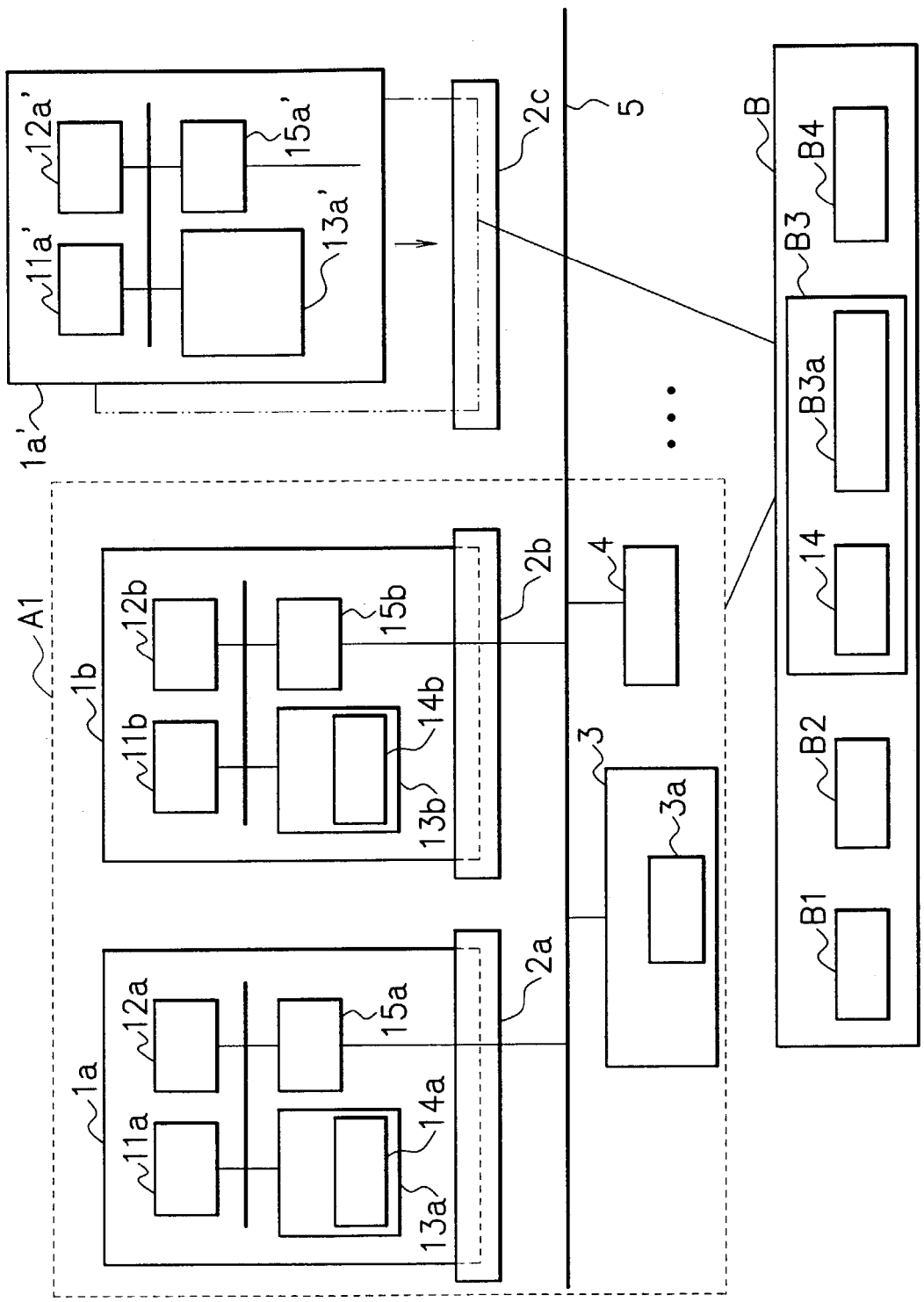
FIG. 4 is a block diagram showing the information processing system depicted in FIG. 3 in which a replacement cell board 1a' is not connected to a connector 2c.

FIGS. 3 to 8 are diagrams for illustrating the configuration of an information processing system according to the first embodiment of the present invention. Referring to FIG. 3, the information processing system of the first embodiment comprises an information processor A and a service processor B, which are interconnected with each other. The information processor A includes a partition A1 managed by OS and a connector 2c for incorporating a replacement cell board 1a'. The replacement cell board 1a' may or may not be set in the connector 2c before a replacement as shown in FIGS. 3 and 4. Besides, the information processor A may include one or more partitions. When there are plural partitions, each partition is provided with its OS and managed by the OS, thus forming a cluster system in which plural OSs are running. In this case, each partition can be regarded as an information processor.

The partition A1 includes cell boards 1 (1a, 1b) as replaceable unit parts, connectors 2 (2a, 2b), a storage 3, a operation/display section 4 and an internal bus 5. The cell board 1 has two CPUs 11 and 12, a memory 13 storing BIOS (Basic Input/Output System) 14, and an MMC 15, which are interconnected by an internal bus to form a CPU—memory complex. The CPUs 11 and 12, memory 13 and MMC 15 are physically mounted on one board. The cell board 1 is connected to the internal bus 5 via the connector 2, and accordingly, the CPUs 11 and 12 mounted on the cell board 1 are connected to the internal bus 5. The storage 3 and operation/display section 4 are also connected with the internal bus 5.

In the information processor A of the first embodiment, the cell boards 1 (1a, 1b), connectors 2 (2a, 2b), storage 3, and operation/display section 4 constitute the partition A1 in which only one OS is running. With this configuration, the information processor A serves as a symmetric multiprocessor (SMP), and the respective CPUs in the partition A equally take charge of part of processing. Besides, the memories 13 (13a, 13b) are physically distributed to the cell boards 1 (1a, 1b) in the partition A1 as a common distributed shared memory. The respective MMCs 15 (15a, 15b) operates in cooperation to create a logical memory area for the entire partition A1. Accordingly, the CPUs 11 (11a, 11b) and 12 (12a, 12b) of the cell boards 1 (1a, 1b) can access any memory 13 (13a, 13b) without discriminating between the memory on the same cell board and the other.

The MMC 15 has functions for controlling information flow in the internal bus of the cell board 1 as well as controlling the operations of the CPUs 11 and 12. In addition, the MMC 15 has a memory copy function for copying information stored in a memory (e.g. memory 13a) into the other memory (e.g. memory 13a'). Techniques disclosed, for example, in Japanese Patent Applications laid open No. 2000-222375 and laid open No. 2001-147861 are available for implementing the MMC having the memory copy function.

Moreover, the MMCs 15 are required to cooperate and control the memory areas of the memories 13 as a common distributed shared memory so that information and data in the entire partition A1 are exchanged in right order. In other words, the processes of the respective MMCs have to be executed in comprehensive order with respect to the entire partition. For that reason, one of the MMCs is determined to be a master MMC according to a signal sent from the service processor when the information processor is started, and the master MMC controls other MMC(s) in the partition as (a) slave MMC(s). The master MMC may be identical with the slave MMC in terms of hardware, and set to be the master by a signal sent from the service processor when the information processor is started.

While, in FIG. 3, the CPUs 11 and 12 of the cell board 1 are logically connected to the internal bus 5 through the MMC 15, the connection between the cell board 1 and the internal bus 5 is not limited to such connection. For example, the cell board 1 may be connected to the internal bus 5 by clock connection (not shown). The CPUs 11 and 12 in each cell board can access the memory 13 in another cell board as well as communicating with the storage 3 and operation/display section 4 through the connection via the MMC 15.

The replacement cell board 1a' is a replacement unit part for the cell board (unit part) 1a. The information processor A is provided with the connector 2c (replacing connection means) for incorporating the replacement cell board 1a'. The replacement cell board 1a' may be set in the connector 2c without being used during normal operation as shown in FIG. 3, or set therein only when the cell board 1a is dynamically replaced by the cell board 1a' (when there is a need for a replacement) as shown in FIG. 4. Having been set in the connector 2c, the cell board 1a' is connected to the internal bus 5 via the connector 2c.

The cell board 1a' has a hardware configuration so that it can replace the cell board 1a. As for the replaceable hardware configuration, the cell board 1a' may have the same configuration as that of the cell board 1a, or may have at least the same parts for storing information therein as those of the cell board 1a. The CPUs 11 and 12, memory 13 and MMC 15 serve as the parts for storing information in the cell board 1 of this embodiment. When the cell board 1a' has the same parts for storing information provided to the cell boards 1a, other parts of the cell board 1a' may be different from those of the cell board 1a. In addition, the memory 13a' may have a larger capacity than that of the memory 13a. Incidentally, since revisions sometimes make differences in the CPUs due to bug fixing, process shrinkage and the like, the CPUs regarded as the same can be different from one another depending on the timing of the production. However, when the replacement cell board 1a' and the cell board 1a have the same register configuration and BIOS, the CPUs (hardware configuration) of the two cell boards are considered to be the same.

The BIOS 14 (14a, 14b) is a program for performing control operation between the OS and hardware, and capable of making each CPU in the cell board 1 copy information stored in its register into the register of another CPU on instructions from the service processor B. Additionally, the BIOS 14 can handle the forced interruption, suspension and restart of the operation performed by the respective CPUs 11 and 12 in the partition A1 according to the OS.

Figure 5:
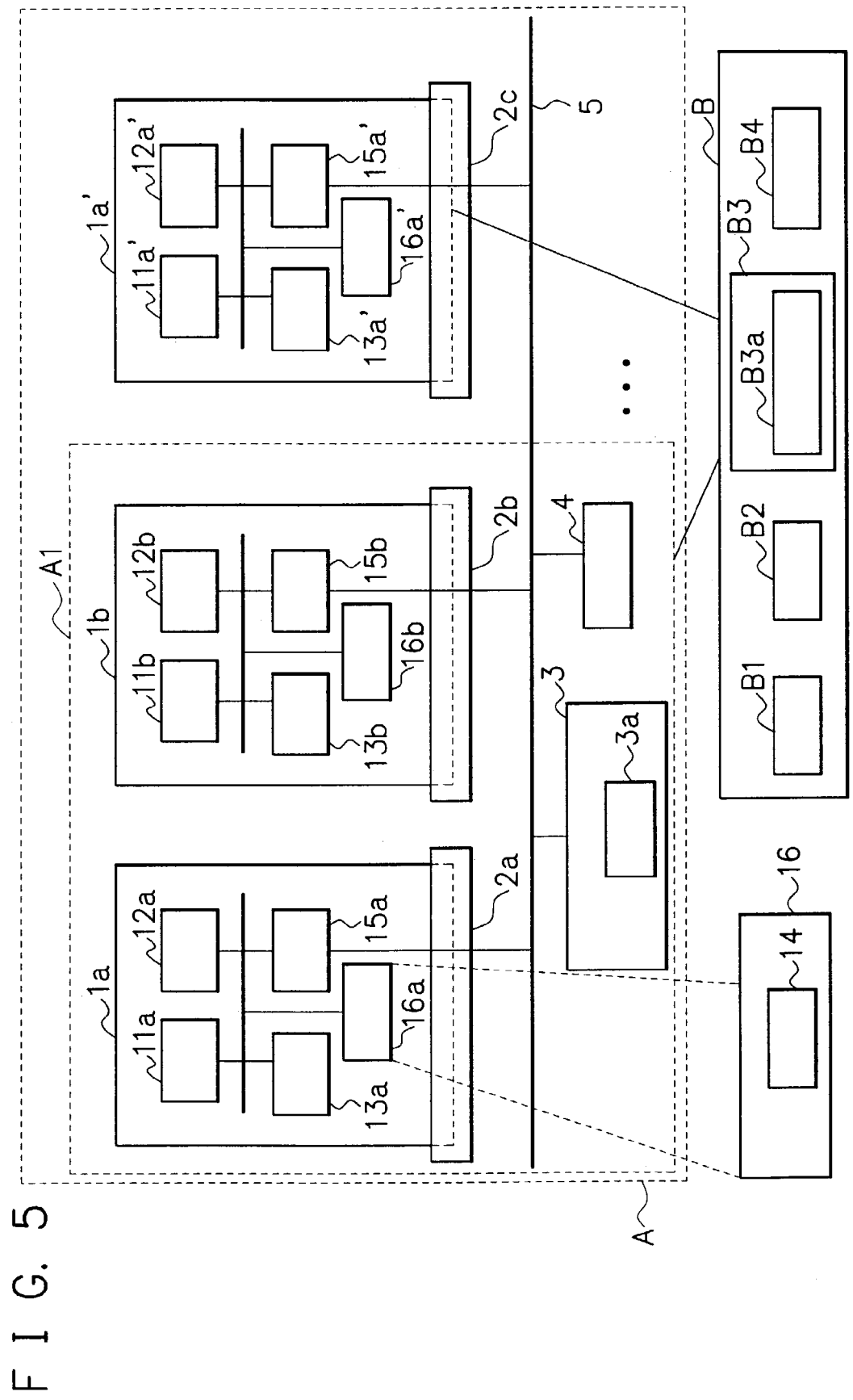
FIG. 5 is a block„diagram showing another constructional example of the information processing system in which each cell board includes a ROM 16 storing BIOS.

The BIOS 14 is read from the service processor B on startup, and stored in the memory 13 (13a, 13b) of the cell board 1 (1a, 1b). Incidentally, the BIOS 14 may be stored in a ROM 16 mounted on the cell board 1 as shown in FIG. 5. An electronically rewritable memory is available as the ROM 16 if the memory can keep data in the power off state. Examples of the ROM 16 include an EEPROM (Electronically Erasable and Programmable Read Only Memory) and a flash memory. Not all the cell boards 1 but only the specified cell board 1 may be provided with the ROM 16 storing the BIOS 14 therein. Besides, when the BIOS 14 is stored in the logical memory area for the entire partition A1, no special limitations are imposed on the storage location of the BIOS 14. For example, the ROM 16 may be mounted on other parts such as a back plane.

The connector (connection means) 2 is formed so that the cell board 1 can be set therein, and connects the cell board 1 and the internal bus 5. The connector 2 and internal bus 5 may be, in physical terms, a back plane having connectors thereon. The connection means is only required to connect the cell board 1 with the internal bus 5, and not limited to the connector. For example, a cable may be employed as the connection means.

Figure 6:
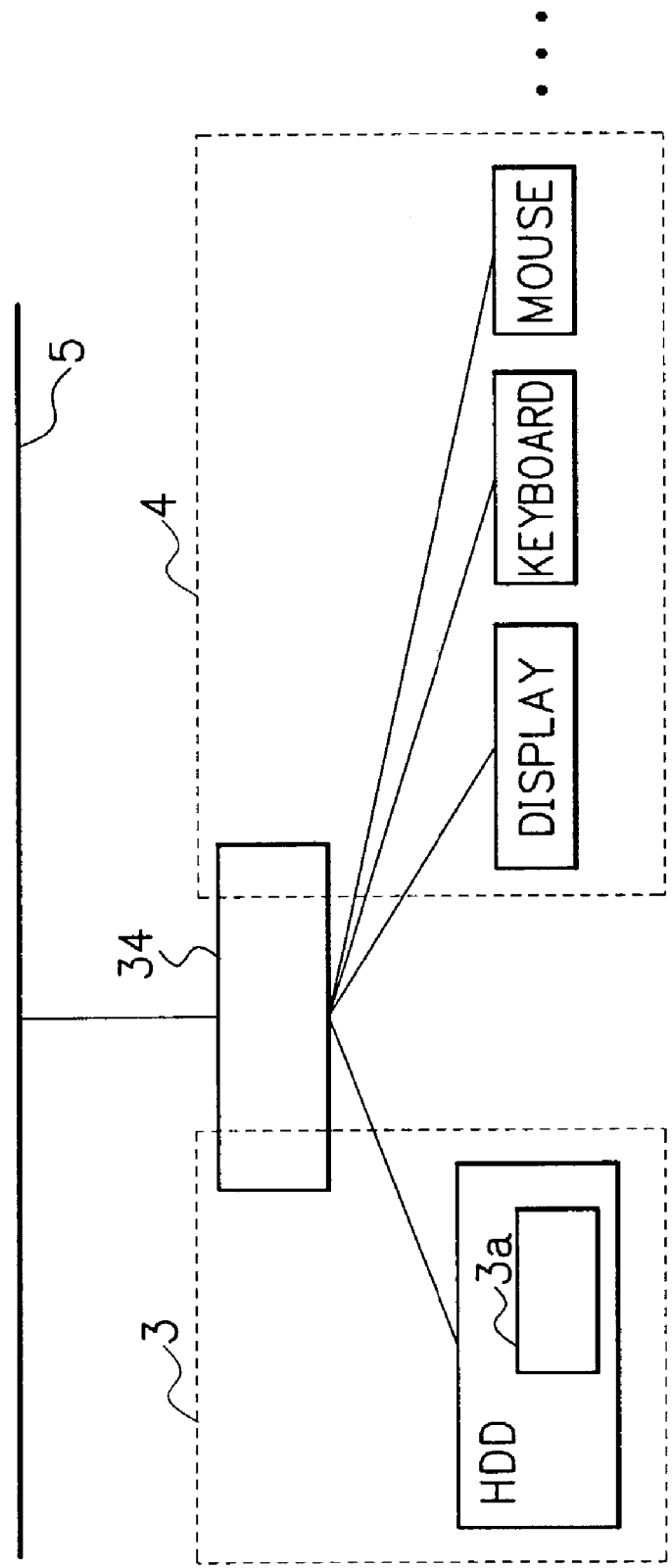
FIG. 6 is a block diagram showing a constructional example of a storage 3 and a operation/display section 4.

With reference to FIG. 6, the storage (storing means) 3 stores the OS 3a for making the partition A1 operate. HDD (hard disk drive) or the like can be used as the storage 3. On the other hand, the operation/display section 4 displays data or information, and is used by an operator for operating the partition A1. The operation/display section 4 need only have operational and indicative functions. Examples of the operation/display section 4 include, but not limited to, a display, keyboard and mouse. Additionally, it is possible to use an operating terminal unit connected via, for example, the Ethernet. The storage 3 and operation/display section 4 are connected to the internal bus 5 via an I/O board 34 as shown in FIG. 6. The connections between the I/O board 34 and the above-mentioned peripheral equipment may be established by a PCI (peripheral component interconnect) controller or a PCI bus. Besides, the I/O board 34 may be connected to the internal bus 5 via the connector 2. Other peripheral equipment connected to the partition A1 such as a printer may be also connected to the I/O board 34.

Figure 7:
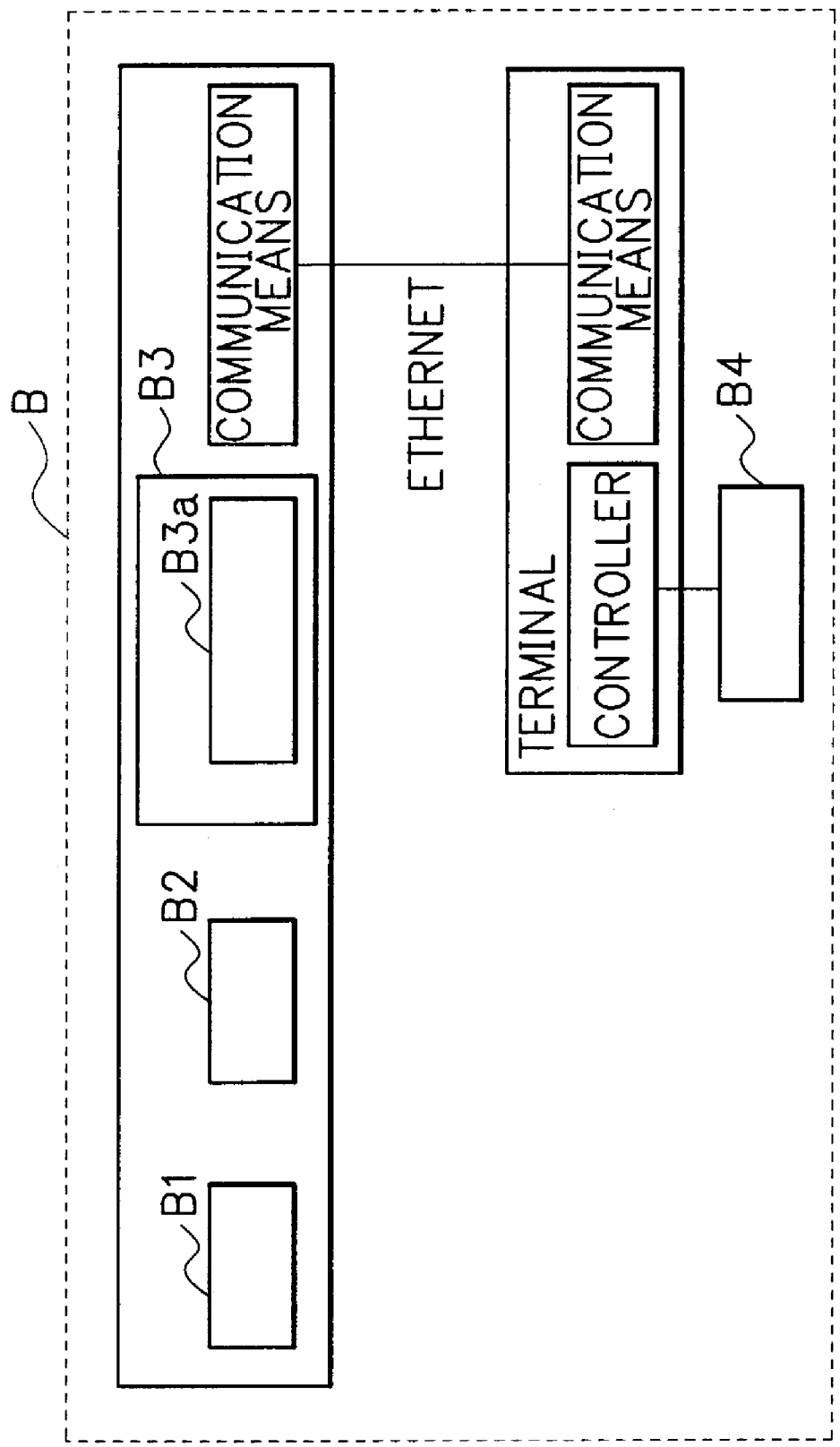
FIG. 7 is a block diagram showing a constructional example of a service processor B.

The service processor B includes a control means B1, a detection means B2, a storing means B3, and an operation/display means B4. The storing means B3 stores a control program B3a. The service processor B operates independently of the information processor A under the control of the control program B3a. That is, the service processor B operates independently of the OS(s) stored in the partition(s) in the information processor A. As long as the service processor B is able to operate in the aforementioned manner, there is no limitation on its physical configuration. For example, as shown in FIG. 7, hardware of the service processor B may be provided with a board on which a microcomputer (not shown) and a memory (not shown) are mounted as a built-in computer, and the operation/display means B4 such as a display and a keyboard may be connected with a terminal such as a PC that is connected to the board via the Ethernet.

The service processor B executes initialization when the information processor A is started as well as monitoring failures during operation. In order to conduct the initialization and monitoring, the service processor B stores information (not shown) on the configuration of the information processor A in the storing means B3. For example, the storing means B3 stores information about the settings determined by a user (network administrator) and the current configuration of the information processor A, which varies according to the connections via the internal bus 5. Examples of the current configuration include the number of the cell boards in the information processor A, the number of the CPUs in each cell board, and the memory capacity of each cell board. These functions of the service processor B for the initialization and failure management (failure monitoring) enable the user to set up or monitor the information processor A through the operation/display means B4.

Figure 8:
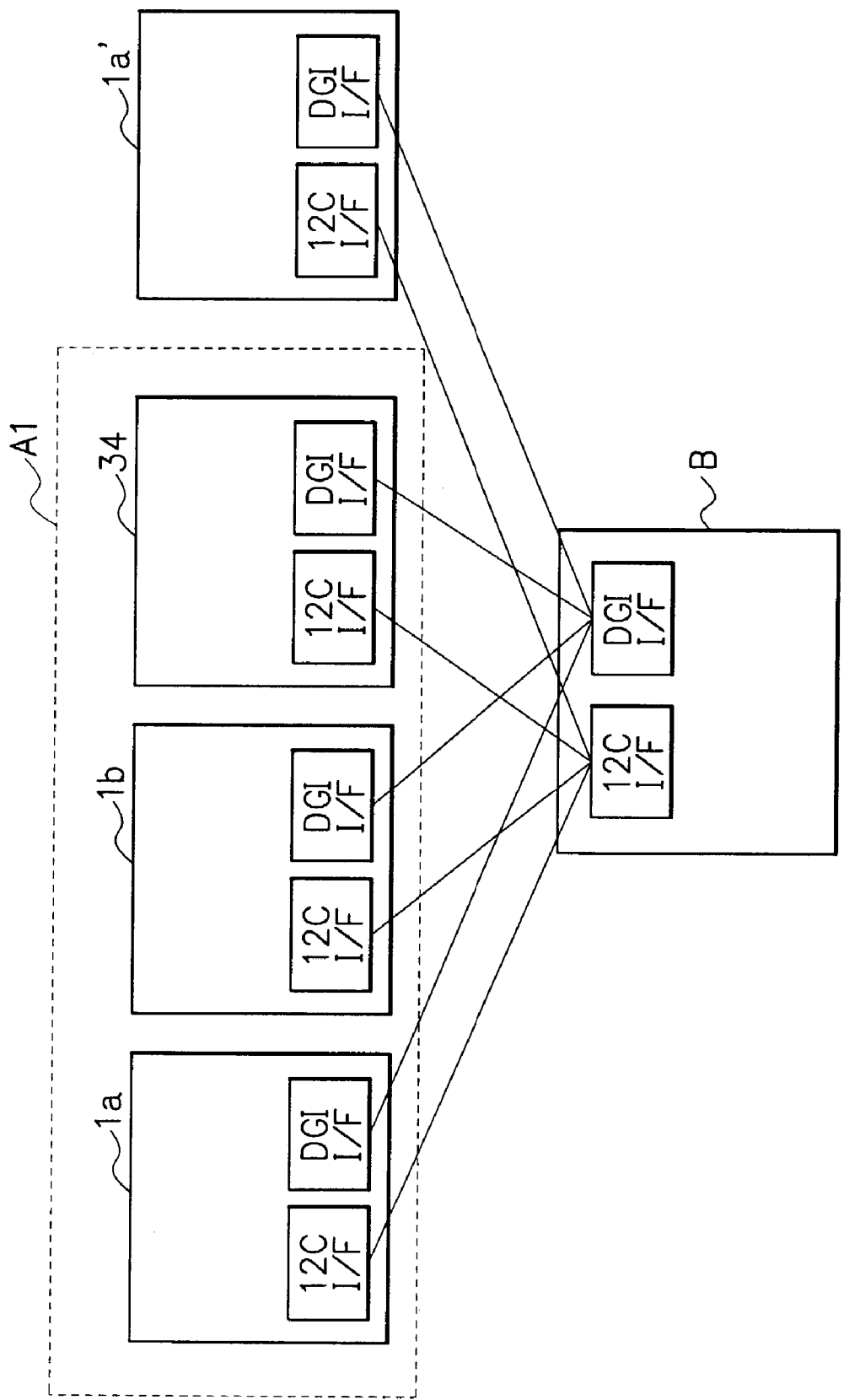
FIG. 8 is a block diagram showing connection other than logical connection of CPUs among the service processor B, cell boards and an I/O board.

For the purpose of the initialization and failure monitoring, the service processor B is connected to the cell boards 1 (1a, 1b), I/O board 34 and replacement cell board 1a' through 12C interfaces (12C I/F) and diagnostic interfaces (DGI I/F) as shown in FIG. 8. The respective boards operate according to commands entered via the interfaces. The 12C I/F is used for power control. The DGI I/F is used for logical control to make a diagnosis. While the connections established by the 12C I/Fs and DGI I/Fs are different from the logical connections between the CPUs by the internal bus 5 shown in FIGS. 3 and 5, the service processor B may be physically connected with the cell boards 1 (1a, 1b, 1a') and the I/O board 34 through the connectors (2a, 2b, 2c). Besides, it is possible to provide cables-for connecting the 12C I/Fs and DGI I/Fs in addition to the connectors 2. FIG. 4 illustrates the case where the connection by the interface is also made via the connector 2 in physical terms.

The control means B1 controls the entire operation of the service processor B by the control program B3a stored in the storing means B3. According to the control operation, the BIOS 14 and MMC 15 control the CPUs 11 and 12 or data flow when dynamically replacing the CPUs in the information processor A, and setting information of the information processor A such as a logical ID is changed.

The detection means B2 is provided with the 12C I/F, and detects whether or not the replacement cell board 1a' is set in the connector 2c that is not included in the partition A1.

The storing means B3 stores the control program B3a and information on the configuration of the information processor A (not shown). In FIG. 3, the BIOS 14 is stored in the storing means B3 of the service processor B, and read into the memories 13 of the cell boards 1 in the partition A1. When the BIOS 14 is previously stored in the cell board 1 as shown in FIG. 5, the storing means B3 does not have to store the BIOS 14.

In the case where the service processor B is not provided with a mass storage device such as an HDD, for example, where the storing means B3 is a fixed capacity nonvolatile memory mounted on a board, the control program B3a may be a combination of equivalents for the BIOS, OS and applications of a common PC. In this case, the OS may be an RTOS (Real Time OS). On the other hand, when the service processor B is of the same physical configuration as a common PC having a mass storage, the control program B3a does not need to be the combination as is described above.

The operation/display means B4 allows the operator of the information processing system to enter commands or instructions to the information processor A via the service processor B, and indicates operation results. Examples of the operation/display means B4 include a display, keyboard and mouse. These peripheral devices may be connected with a terminal that is connected to the hardware of the service processor B via the Ethernet as described previously with reference to FIG. 7.

In the following, a description will be given of the operation of the information processing system for the dynamic CPU replacement according to the first embodiment of the present invention with reference to FIG. 9.

FIG. 9 is a flowchart showing procedures for the dynamic CPU replacement according to the first embodiment. The procedures may start at operator's instruction for the replacement of the cell board input through the operation/display means B4 of the service processor B. Alternatively, the procedures may automatically start according to judgment on the result of monitoring of the information processor A by the service processor B or an external controller (not shown) that operates in cooperation with the service processor B. Incidentally, the replacement operation starts on condition that the detection means B2 has detected that the replacement cell board 1a' is connected to the internal bus 5 via the connector 2c. When the connection of the replacement cell board 1a' with the connector 2c is not detected, an error message may be sent to the operator.

First, the service processor B instructs the respective MMCs 15 in all the cell boards 1 in the partition A1 including the cell board 1a to be replaced and the replacement cell board 1a' to copy memory data stored in the memory 13a in the cell board 1a onto the memory 13a' in the replacement cell board 1a' (step S1).

Having received the instruction, the MMC 15 of each cell board 1 enters memory copy mode in which data to be read out of the memory 13a is read out of the memory 13a but the data to be written into the memory 13a is written into both memory 13a and memory 13a'. In addition, the MMCs 15a and 15a' of the cell board 1a and replacement cell board 1a' start copying the data from the memory 13a to the memory 13a' in cooperation with each other. Accordingly, the same data written into the memory 13a is written into the memory 13a', which assures a perfect data copy on completion of memory copying even when memory 13a is rewritten, namely, its contents that have already been copied are changed in process of the memory copying.

When the data stored in the memory 13a have been copied to the memory 13a' and the memory copying is completed, the respective MMCs 15a and 15a' notify the service processor B of completion of the copying while carrying on the memory copy mode (step S2).

On receipt of the notice of the completion from the MMCs 15a and 15a', the service processor B writes data to the register of the master MMC 15, thus issuing an operation stop signal to all the CPUs 11 and 12 in the partition A1. Consequently, the CPUs 11 and 12 suspends the operation performed according to the OS 3a, and gives control to the BIOS 14. The function of the CPU for suspending operation controlled by the OS and giving the BIOS control is similar to interruption, and generally provided to the CPU. In this manner, the service processor B forces all the CPUs 11 and 12 in the partition A1 to temporarily stop the operation independently of the OS 3a and to give control to the BIOS 14. After that, the service processor B instructs the BIOS 14 to remove the CPUs 11a and 12a in the cell board 1a, and copy information stored in such registers as an arithmetic register, control register, etc. of the CPUs 11a and 12a into the CPUs 11a' and 12a' (step S3).

After having copied the information stored in the arithmetic register, control register, etc. of the CPUs 11a and 12a into the CPUs 11a' and 12a' at the instruction from the service processor B, the BIOS 14 notifies the service processor B of completion of the copying and suspends the operation without returning control to the OS 3a (step S4). That is, the CPUs 11a' and 12a' in the cell board 1a' are suspended on standby.

Having received the notice of completion of the copying, the service processor B changes information on the cell board 1a and replacement cell board 1a' stored outside the CPUs 11 and 12. In changing the outside information of the CPUs 11 and 12, identification numbers (logical IDs) are swapped, and the settings of memory routing are changed in each MMC 15. By swapping the identification numbers of the cell boards 1a and replacement cell board 1a' stored in the MMCs 15a and 15a', respectively, the OS 3a in the partition A1 comes to recognizes the replacement cell board 1a' as the cell board 1a and vice versa. Besides, the setting change of memory routing in each MMC 15 means that the settings of each MMC 15 are changed so that the replacement cell board 1a' is recognized as the cell board 1a and vice versa when the MMC 15 control data flow.

After that, the service processor B instructs the respective MMCs 15 of all the relevant cell boards 1 (1a, 1b, 1a') to exit the memory copy mode (step S5). The MMCs 15 stop the memory copying at the instruction, and notify the service processor B about that (step S6). Subsequently, the service processor B releases all the suspended CPUs 11 and 12 in the partition A1 to resume the operation, and instructs the BIOS 14 to return control to the OS 3a (step S7).

Accordingly, all the CPUs 11 and 12 in the partition A1 restart the operation according to the OS 3a (step S8). At this point, the cell board which the OS 3a regards as the cell board 1a is the replacement cell board 1a' in physical terms. The service processor B informs an operator through the operation/display means B4, when needed, that the removal of the call board 1a and the incorporation of the replacement cell board 1a' have been completed (step S9). Thus, in the information processing system according to the first embodiment, the cell board 1a can be removed from the partition A1 without shutting down the OS 3a and replaced by the replacement cell board 1a' while the information processor A is in operation.

While a preferred embodiment of the present invention has been described as the first embodiment using specific terms, such description is for illustrative purposes only, and it is to be understood that changes and variations may be made without departing from the spirit or the scope of the present invention. It is possible to change such things as the number of the CPUs in each cell board, the memory capacity, and the configuration of the MMC. Suppose, for instance, each of the cell boards is provided with four CPUs, similar operation is carried out.

Besides, the number of the cell boards 1 in the partition A1 is not limited to two, and may be one or more than two. In the case where the partition A1 includes one cell board 1, the setting change of the MMCs 15 is performed by the control means B1 in the service processor B for the replacement cell board 1a' and the one cell board 1 at step S5.

In addition, although the cell board 1a is replaced in the above-described first embodiment, it is possible to replace two or more cell boards or the cell board 1b in the similar manner.

Incidentally, while the storage 3 stores the OS 3a in the above description of the first embodiment, the OS 3a does not have to be stored in the storage 3 as long as OS 3a can manage the partition A1. For example, necessary parts of the OS may be loaded in the memory 13 via a network at the time of activation due to a network boot. In this case, partition A1 may be provided with no storage such as the HDD.

Moreover, while the 12C I/F and DGI I/F are used as the interface for connecting the service processor B with each board in the above-described first embodiment, available interfaces are not limited to the 12C I/F and DGI I/F. Other interfaces may be used as long as the interfaces enable communications between the service processor B and the respective boards.

Furthermore, the respective cell boards 1 are interconnected via the internal bus 5 in the above-described first embodiment, the connection between the cell boards is not limited to the bus connection as long as the logical memory area for the entire partition A1 can be generated. For example, the connection may be established through the crossbar switching system.

In the following, a description will be given of an information processing system according to the second embodiment of the present invention. In the second embodiment, the CPU is a replaceable unit part. That is, the CPU in the second embodiment is made replaceable as a unit part instead of using the cell board as in the first embodiment. FIG. 10 is a block diagram showing a constructional example of the information processing system according to the second embodiment. Parts in common with those in the first embodiment are designated by similar numerals, and an explanation thereof will be omitted.

Referring to FIG. 10, the information processing system of the second embodiment comprises an information processor AA and a service processor B, which are interconnected with each other. The information processor AA includes CPUs 11 (11a, 11b, 11a'), connectors 2 (2a, 2b, 2c), a mother board (M/B), a storage and a operation/display section. The M/B is provided with a memory and a ROM 16, and has a function for controlling the CPUs 11. The ROM 16 stores BIOS. An electronically rewritable memory is available as the ROM 16 as is described previously. The storage stores OS which controls the information processor AA. The CPUs 11 are connected to the M/B via the connectors 2 by being set in therein. The aforementioned control operation and detection by the control means B1 and detection means B2 of the service processor B are performed for the CPUs (unit part) 11 through the connectors 2 and the M/B.

Next, the operation of the information processing system according to the second embodiment will be explained with reference to FIG. 11. FIG. 11 is a flowchart showing procedures for the dynamic CPU replacement according to the second embodiment. In the second embodiment, the M/B performs control operation for the CPUs, which is carried out by the MMC 15 of each cell board 1 in the first embodiment. But for the omission of memory copying operation, the procedures in the second embodiment otherwise resemble the procedures in the first embodiment as described previously in connection with FIG. 9.

The procedures in FIG. 11 start in the same manner as the procedures shown in FIG. 9. When the dynamic CPU replacement is started, the service processor B instructs the M/B to forcefully stop all the CPUs 11 in the information processor AA and give the BIOS control over the CPUs 11. Then, the service processor B instructs the BIOS to remove the CPU 11a (step S11).

Having received the instruction, the BIOS copies the contents stored in the arithmetic register, control register, etc. of the CPU 11a into the replacement CPU 11a', and notifies the service processor B of completion of the copying (step S12). After that, the CPU 11a' is suspended on standby.

Having received the notice of completion of the copying, the service processor B swaps information on the CPU 11a for the information on the CPU 11a' (step S13). The information on the CPUs 11a and 11a' may be logical IDs. Subsequently, the service processor B instructs the BIOS to release all the suspended CPUs 11 in the information processor AA so that the CPUs 11 resume the operation (step S14).

Accordingly, the BIOS returns control over the CPUs 11 to the OS, and all the CPUs 11 in the information processor AA restart the operation according to the OS (step S15). At this point, the CPU which the OS regards as the CPU 11a is the replacement CPU 11a' in physical terms. The service processor B informs an operator through the operation/display means B4, when needed, that the removal of the CPU 11a and the incorporation of the replacement CPU 11a' have been completed (step S16).

Incidentally, while the CPU is used as a replaceable unit part in the above description of the second embodiment, the replaceable unit part may be further provided with parts that do not include area for storing information such as a register and a memory. For example, the replaceable unit part may be a board on which the CPU and the parts not having storage area are mounted.

Besides, in the above-described embodiments of the present invention, at least a part of the service processor is incorporated in the information processor. However, the service processor is not necessarily incorporated in the information processor if connected thereto so that the service processor can control each cell board or CPU. For example, an external device may be provided as the service processor, and connected to the information processor via the LAN. Alternatively, each of the service processor and the cell boards may be a device or a unit, and connected with one another to form the information processing system.

As set forth hereinabove, in accordance with the information processing system of the present invention, CPU of an information processor can be dynamically replaced without shutting down OS running in the information processor by the steps as follows: the operations of CPUs in the information processor managed by the OS are forcefully suspended according to a signal from a service processor connected to the information processor; data stored in a unit part to be replaced is copied into a replacement unit part; information on the unit part is swapped for information on the replacement unit part; and the operations of the CPUs managed by the OS are resumed. Accordingly, even when the OS does not support the dynamic CPU replacement, the CPU can be dynamically replaced. In other words, the CPU in the information processor can be dynamically replaced regardless of the type of OS running in the information processor. Thus, in the case, for example, where an intermittent failure or the like is detected in the CPU, preventive maintenance can be carried out regardless of the type of OS without stopping the information processor.

Besides, the replaceable unit part may be a cell board having CPU(s), a memory and an MMC. That is, the cell board can be dynamically replaced even when the OS does not support the dynamic cell board replacement. In other words, the cell board in the information processor can be dynamically replaced regardless of the type of OS running in the information processor. Thus, in the case, for example, where an intermittent failure or the like is detected in the CPU or memory, preventive maintenance can be carried out regardless of the type of OS without stopping the information processor.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An information processing system comprising an information processor and a service processor, the information processor and the service processor being interconnected with each other, wherein:

the information processor includes:
one or more unit parts having at least one CPU that stores information in a register; and
a storage that stores an OS by which the information processor operates;

the service processor includes:
a detection means for detecting whether or not a replacement unit part that can replace the unit part is connected to the information processor; and
a control means for controlling the information processor after the detection means has detected the connection to stop a process being executed by the CPU according to the OS, controlling the information processor to copy information stored in the unit part into the replacement unit part, changing information on the unit part and the replacement unit part so that the replacement unit part can operate according to the OS as a substitute for the unit part, and controlling the information processor to restart the process according to the OS by using the replacement unit part; and wherein the service processor and the information processor operate independently.

2. An information processing system comprising an information processor and a service processor, the information processor and the service processor being interconnected with each other, wherein:

the information processor includes:
one or more unit parts having at least one CPU that stores information in a register, a memory, and a main memory controller;
a storage that stores an OS by which the information processor operates;

the service processor includes:
a detection means for detecting whether or not a replacement unit part that can replace the unit part is connected to the information processor; and
a control means for:
controlling the information processor after the detection means has detected the connection to stop a process being executed by the CPU according to the OS,
controlling the information processor to copy information stored in the unit part into the replacement unit part,
changing information on the unit part and the replacement unit part so that the replacement unit part can operate according to the OS as a substitute for the unit part, and controlling the information processor to restart the process according to the OS by using the replacement unit part; and wherein the service processor and the information processor operate independently.

3. An information processing system comprising an information processor and a service processor, the information processor and the service processor being interconnected with each other, wherein:

the information processor includes:

one or more unit parts having at least one CPU that stores information in a register, a memory and a main memory controller;

a storage that stores an OS;

the information processor operates according to the OS and a BIOS;

the service processor includes:

a detection means for detecting whether or not a replacement unit part that can replace the unit part is connected to the information processor; and a control means for controlling the information processor after the detection means has detected the connection to stop a process being executed by the CPU according to the OS, controlling the information processor to copy information stored in the unit part into the replacement unit part, changing information on the unit part and the replacement unit part so that the replacement unit part can operate according to the OS as a substitute for the unit part, and controlling the information processor to restart the process according to the OS by using the replacement unit part; and wherein the service processor and the information processor operate independently.

4. An information processing system comprising an information processor and a service processor, the information processor and the service processor being interconnected with each other, wherein:

the information processor includes:

one or more unit parts having at least one CPU that stores information in a register, a memory and a main memory controller;

a storage that stores an OS by which the information processor operates;

the service processor includes:

a detection means for detecting whether or not a replacement unit part that can replace a unit part is connected to the information processor; and a control means for controlling the information processor after the detection means has detected the connection to stop a process being executed by the CPU according to the OS, controlling the information processor to copy information stored in the unit part into the replacement unit part, swapping identification information of the unit part for identification information of the replacement unit part as well as resetting the main memory controller of the one or more unit parts so that the replacement unit part can operate according to the OS as a substitute for the unit part, and controlling the information processor to restart the process according to the OS by using the replacement unit part; and wherein the service processor and the information processor operate independently.

5. An information processing system comprising an information processor and a service processor, the information processor and the service processor being interconnected with each other, wherein:

the information processor includes:

one or more unit parts having at least one CPU that stores information in a register, a memory, and a main memory controller; and a storage that stores an OS;

the information processor operates according to the OS and a BIOS; and the service processor includes:

a detection means for detecting whether or not a replacement unit part that can replace a unit part is connected to the information processor; and a control means for controlling the information processor after the detection means has detected the connection to stop a process being executed by the CPU according to the OS, controlling the information processor to copy information stored in the unit part into the replacement unit part, swapping identification information of the unit part for identification information of the replacement unit part as well as resetting the main memory controller of the one or more unit parts so that the replacement unit part can operate according to the OS as a substitute for the unit part, and controlling the information processor to restart the process according to the OS by using the replacement unit part; and wherein the service processor and the information processor operate independently.

6. The information processing system claimed in claim 1, wherein:

the information processor further includes a replacing connection means so that the replacement unit part can be connected to the information processor; and the detection means detects whether or not the replacement unit part is connected to the replacing connection means.

7. The information processing system claimed in claim 2, wherein:

the information processor further includes a replacing connection means so that the replacement unit part can be connected to the information processor; and the detection means detects whether or not the replacement unit part is connected to the replacing connection means.

8. The information processing system claimed in claim 3, wherein:

the information processor further includes a replacing connection means so that the replacement unit part can be connected to the information processor; and the detection means detects whether or not the replacement unit part is connected to the replacing connection means.

9. The information processing system claimed in claim 4, wherein:

the information processor further includes a replacing connection means so that the replacement unit part can be connected to the information processor; and the detection means detects whether or not the replacement unit part is connected to the replacing connection means.

10. The information processing system claimed in claim 5, wherein:
the information processor further includes a replacing connection means so that the replacement unit part can be connected to the information processor; and
the detection means detects whether or not the replacement unit part is connected to the replacing connection means.

11. An information processing system control method for controlling an information processing system in which an information processor and a service processor are interconnected with each other, the information processor includes one or more unit parts having at least one CPU that stores information in a register, a storage storing an OS by which the information processor operates, the method comprising the steps of:
operating the service processor independently of the information processor;
detecting by the service processor whether or not a replacement unit part that can replace a unit part is connected to the information processor;
copying information stored in the unit part into the replacement unit part in the information processor at the instruction of the service processor,
wherein copying is executed after detecting and before restarting;
stopping a process being executed by the at least one CPU according to the OS in the information processor at the instruction of the service processor;
changing information on the unit part and the replacement unit part so that the replacement unit part can operate according to the OS as a substitute for the unit part; and
restarting the process being executed by the at least one CPU according to the OS by using the replacement unit part in the information processor.

12. An information processing system control method for controlling an information processing system in which an information processor and a service processor are interconnected with each other, the information processor includes one or more unit parts having at least one CPU that stores information in a register, a memory, and a main memory controller, and a storage that stores an OS by which the information processor operates, the method comprising the steps of:
the service processor operating independently of the information processor;
detecting by the service processor whether or not a replacement unit part that can replace a unit part is connected to the information processor;
writing a same information onto a memory of the unit part and onto a memory of the replacement unit part in the information processor,
wherein writing is executed after detecting and before restarting;
copying an information stored in a memory of the unit part into a memory of the replacement unit part in the information processor at the instruction of the service processor;
stopping a process being executed by the at least one CPU according to the OS in the information processor at the instruction of the service processor;
copying an information stored in the unit part into the replacement unit part in the information processor at the instruction of the service processor;
changing an information on the unit part and the replacement unit part so that the replacement unit part can operate according to the OS as a substitute for the unit part; and
restarting the process being executed by the at least one CPU according to the OS by using the replacement unit part in the information processor.

13. An information processing system control program comprising a BIOS and a control program for executing in an information processing system in which an information processor and a service processor are interconnected with each other, wherein the information processor includes one or more unit parts having at least one CPU that stores information in a register and a storage storing an OS, and wherein the information processor operates according to the OS and the BIOS, the control program executing the processes of:
independently operating the service processor and the information processor according to the control program;
the service processor detecting whether or not a replacement unit part that can replace the unit part is connected to the information processor;
copying information stored in the unit part into the replacement unit part by the information processor at the instruction of the service processor,
wherein the copying is executed after detecting and before restarting;
stopping a process being executed by the at least one CPU according to the OS by the information processor at the instruction of the service processor;
changing an information on the unit part and the replacement unit part so that the replacement unit part can operate according to the OS as a substitute for the unit part by the service processor; and
restarting the process according to the OS with the use of the replacement unit part by the information processor.

14. An information processing system control program including a BIOS and a control program for executing in an information processing system in which an information processor and a service processor are interconnected with each other, wherein the information processor includes one or more unit parts having at least one CPU that stores information in a register, a memory, and a main memory controller, and a storage storing an OS, the information processor operates according to the OS and the BIOS, the control program executing the processes of:
independently operating the service processor according to the control program;
the service processor detecting whether or not a replacement unit part that can replace the unit part is connected to the information processor;
writing a same information onto a memory of the unit part and onto a memory of the replacement unit part in the information processor,
wherein writing is executed after detecting and before restarting;
copying an information stored in the memory of the unit part into the memory of the replacement unit part by the information processor at the instruction of the service processor;
stopping a process being executed by the CPU according to the OS by the information processor at the instruction of the service processor;
copying an information stored in the unit part into the replacement unit part by the information processor at the instruction of the service processor;

changing an information on the unit part and the replacement unit part so that the replacement unit part can operate according to the OS as a substitute for the unit part by the service processor; and restarting the process according to the OS with the use of the replacement unit part by the information processor.

* * * * *